(12) United States Patent
Labelle et al.

(10) Patent No.: US 7,615,724 B2
(45) Date of Patent: Nov. 10, 2009

(54) ELECTRIC WATER HEATER

(75) Inventors: Guy Labelle, Champfleur (FR);
Jean-Pierre Binot, St. Ouen de Mimbre (FR)

(73) Assignee: SEB S.A., Ecully (FR)

( * ) Notice: Subject to any disclaimer, the term of this patent is extended or adjusted under 35 U.S.C. 154(b) by 407 days.

(21) Appl. No.: 11/547,141

(22) PCT Filed: Mar. 29, 2005

(86) PCT No.: PCT/FR2005/000759

§ 371 (c)(1),
(2), (4) Date: Dec. 6, 2006

(87) PCT Pub. No.: WO2005/099538

PCT Pub. Date: Oct. 27, 2005

(65) Prior Publication Data
US 2008/0029504 A1    Feb. 7, 2008

(30) Foreign Application Priority Data
Apr. 7, 2004    (FR) ................................. 04 03661

(51) Int. Cl.
*F27D 11/00*    (2006.01)
*F24H 1/20*    (2006.01)
(52) U.S. Cl. .................. 219/438; 219/429; 219/510; 219/497; 219/494; 219/492; 219/441; 219/433; 219/436; 219/437; 392/447; 99/295; 99/333
(58) Field of Classification Search ................ 219/438, 219/429, 510, 497, 494, 492, 441, 433, 436, 219/437; 392/447; 99/295, 333
See application file for complete search history.

(56) References Cited

FOREIGN PATENT DOCUMENTS

| DE | 8411995 | * | 8/1984 |
|----|---------|---|--------|
| DE | 84 11 995 | | 9/1984 |
| EP | 0549953 | | 7/1993 |
| WO | 00/34143 | | 6/2000 |

\* cited by examiner

*Primary Examiner*—Shawntina Fuqua
(74) *Attorney, Agent, or Firm*—Young & Thompson

(57) ABSTRACT

An electrical water heater includes a housing, a filling opening delimited by a rim, heating elements, a pouring member, a lid, a tongue mobile between an extended position wherein it seals the pouring member and a pouring position wherein it is retracted, and a pouring control connected to the tongue through an actuating mechanism. The actuating mechanism includes a first mechanism arranged in the housing and having one end connected to the pouring control and one end mobile through a window of the rim, and a second mechanism arranged in the lid and having one end mobile through a window of the lid and one end connected to the tongue, the windows of the rim and of the lid being urged into mutual correspondence when the lid seals the opening, and the corresponding ends of the mechanisms being adapted to cooperate.

10 Claims, 6 Drawing Sheets

ELECTRIC WATER HEATER

FIELD OF THE INVENTION

The present invention relates to an electrical apparatus for heating liquid, such as for example an electric kettle. More particularly, the invention relates to electrical apparatus for heating liquid comprising a housing which defines a chamber adapted to contain a liquid, an upper opening for filling the chamber, which is delimited by a rim, electrical heating means for the liquid, a spout communicating with the chamber and extending adjacent the opening, a lid adapted to close said opening, a tongue movable relative to the lid between an extended position in which it closes the spout and a pouring position in which it is at least in part retracted within the lid, and a pouring control connected to the tongue by an actuating mechanism adapted to place said tongue either in an extended position when the pouring control is inactive, or in a pouring position when the pouring control is active.

THE PRIOR ART

The document FR-A-2 756 476 describes an electric kettle of this type, which is to say which comprises a tongue normally urged into extended position so as to close the spout and which can be more or less retracted by closing a control button mounted movably on the lid. The principal advantage of the kettle described in this document is that the assembly of the actuating mechanism connecting the control button to the tongue is disposed in the lid, which protects it from dirt and permits freeing completely the filling opening when the cover is removed.

Moreover, there exist kettles with movable closure members in the spout, which are connected by a rod passing through the chamber of the kettle to an actuating button movably mounted on the housing opposite spout. But the presence of such a rod considerably impedes the filling and cleaning of the kettle. Moreover, the rod is adapted to become encrusted or to rust in use.

It should be emphasized that, as described in the document FR-A-2 756 476, the mounting of the button forming the pouring control on the lid imposes a positioning of the pouring control at the top of the kettle. Such a positioning of the pouring control requires a handle permitting gripping adjacent the lid to be able to actuate the latter whilst tilting the kettle, which renders the pouring action less natural in the minds of certain consumers. Moreover, the actuation of the pouring control with the thumb is less intuitive and decreases the firmness of gripping the handle for certain users.

OBJECT OF THE INVENTION

The present invention has for its object to overcome these drawbacks by proposing an electric apparatus for heating liquid in which the actuation of the pouring control will be comfortable and certain for most users, whilst keeping the advantage of a mechanism protected from dirt which does not impede filling the kettle.

SUMMARY OF THE INVENTION

To this end, the present invention has for its object an apparatus of the mentioned type, characterized in that the actuating mechanism connecting the pouring control to the tongue comprises a first mechanism arranged in the housing and having a first end connected to the pouring control and a second end movable through a window of the rim of the opening, and a second mechanism arranged in the lid and having a first end movable through a window of said lid and a second end connected to the tongue, the window of the rim and the window of the lid being arranged to come into correspondence when the lid closes the opening, and the second end of the first mechanism being adapted to coact with the first end of the second mechanism, such that the actuation of the pouring control will be transmitted to the tongue via the first and second mechanisms.

Thus, by providing two separate mechanisms which coact together during the closing of the lid, there is a possibility of mounting the pouring control in any suitable position on the housing, and particularly but not necessarily below the handle of the apparatus, whilst keeping the advantages of the actuating mechanism protected and of a filling opening which is entirely exposed.

In preferred embodiments of the invention, there can be used moreover one and/or the other of the following arrangements:

- the second end of the first mechanism is slidably mounted in a given direction and comes into abutment against the first end of the second mechanism, which is movable against the return force of a resilient member in a direction substantially co-linear to said given direction, such that the coaction between the first and second mechanisms is carried out by simple contact;
- the first end of the second mechanism projects through the window of the lid and penetrates the window of the rim, when the boiling control is inactive, so as to form a locking means of the lid on the kettle;
- the second end of the first mechanism has a path sufficient to cause it to project from the window of the rim and enter the window of the lid when the pouring control is actuated, thereby maintaining the locking of the lid on the housing;
- the housing has an opening which opens into the spout and into which extends the tongue of the lid when this latter closes the opening, said first and second mechanisms being adapted such that at least a portion of said tongue extends into said opening when the pouring control is actuated; thus, the tongue in the pouring position always forms a retaining means of the cover on the kettle;
- the second mechanism is adapted to create an amplified movement of the tongue relative to the movement of its first end;
- the second mechanism comprises a lever pivotally mounted about an axle substantially parallel to the normal to the opening, and having a first end forming the first end of said mechanism and a second end provided with teeth, said first end being urged radially outwardly by a resilient member;
- the second mechanism comprises a pivoting member provided with a first toothed sector which engages a straight rack connected to the tongue and a second toothed sector which engages the teeth of the second end of the pivoting lever, said first toothed sector having a radius greater than the radius of said second toothed sector;
- the first mechanism comprises a lever mounted swingably relative to the housing about an axle and having a first end connected to the pouring control and a second end bearing against a first end of said piston, said piston being mounted slidably in said housing against the action of a resilient member and having a second end which forms the second end of said first mechanism;
- the housing comprises a handle located on the side opposite the spout, and the pouring control is present in the form of a trigger arranged below said handle.

BRIEF DESCRIPTION OF THE DRAWINGS

Other characteristics and advantages of the invention will become apparent in the course of the description which follows, given by way of non-limiting example, with reference to the accompanying drawings, in which.

In the various figures, the same reference numerals have been used to designate identical or similar elements.

DETAILED DESCRIPTION OF THE INVENTION

Figure 1:
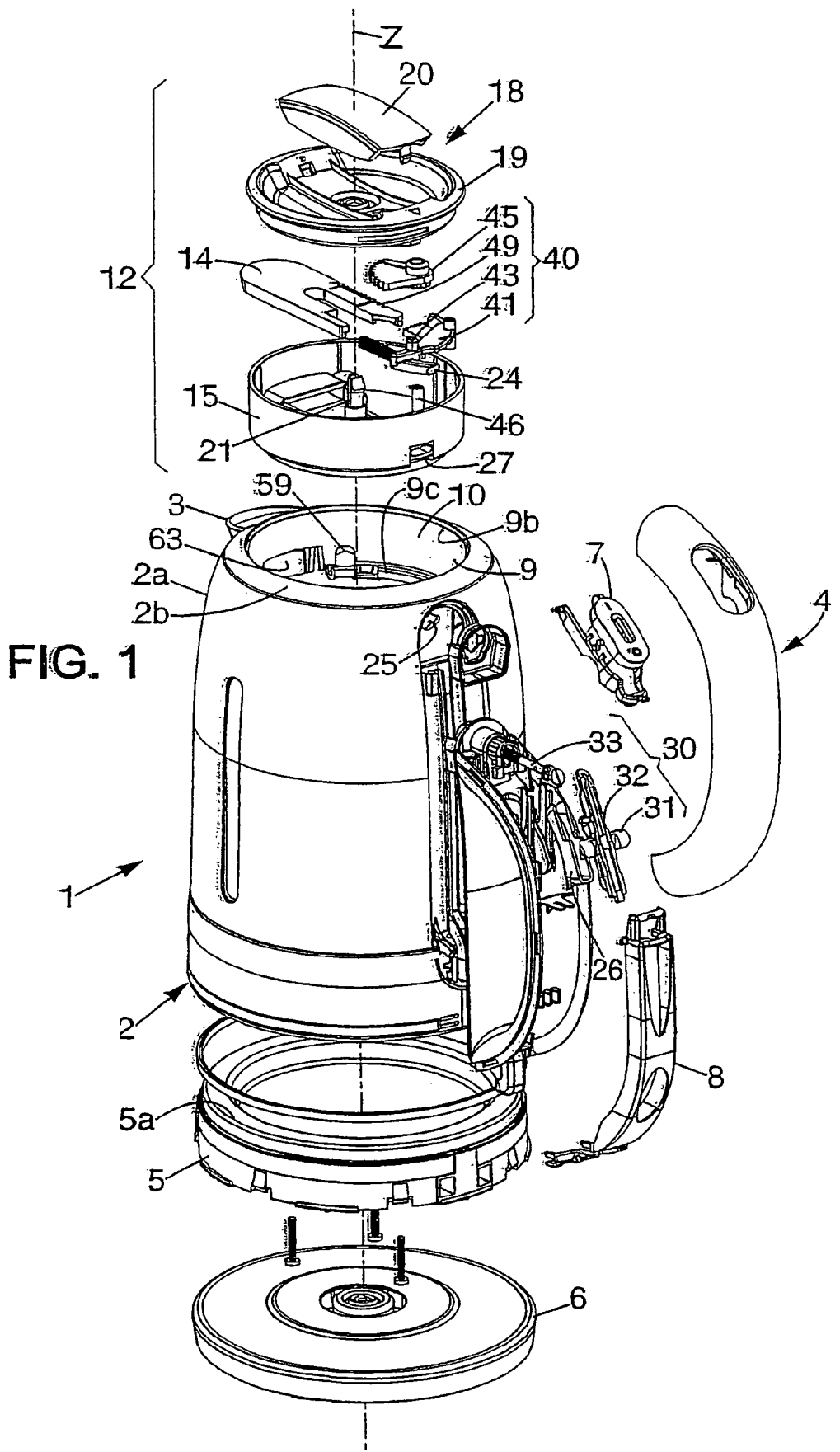
FIG. 1 is an exploded perspective view of the principal elements of a kettle made according to the invention which comprises a closable spout and a handle.

The electric kettle 1 shown in FIG. 1 comprises a housing 2 whose body 2a defines a substantially cylindrical chamber centered on a vertical axis Z. The housing 2 also comprises a spout 3, a handle 4 and a bottom 5.

The bottom 5 comprises a metallic plate 5a delimiting the bottom of the chamber which is in contact with an electrical resistance, not shown, so as to heat the water or any other liquid contained in the chamber.

The bottom 5 of the kettle is adapted to rest on a base 6 provided at its center with an electrical connection. The bottom 5 comprises in known manner a connector adapted to establish an electrical connection with the connection of the base 6 no matter what the orientation of the kettle resting on the base. The interior of the bottom 5 comprises, in addition to the electrical resistance, a switch to establish a connection between the connection and the electrical resistance. The operation of the kettle is controlled by an on/off button 7 arranged on the handle 4 and connected to the switch by a lever 8.

The housing 2 has in its upper portion a rim 9 which defines an opening 10. This opening 10 has a relatively extensive surface so as to permit easy filling of the chamber. The rim 9 is formed by an annular wall of the housing which has a vertical cylindrical portion 9b coaxial to the axis Z and a small collar 9c extending radially toward the central axis Z from the base of the vertical portion. The surface of the opening thus defined by the rim 9 has a normal direction co-linear with the central axis Z. However, the chamber and the opening 10 could have other configurations than cylindrical or could have symmetrical axes which will not be co-linear.

The kettle also comprises a removable grid 12 adapted to close the opening 10, which in this case has the shape of a cylinder of small height, so as to coact with the rim 9 of the opening. But the lid could have a different shape, particularly in the case in which the rim of the opening will be an overall flat face extending essentially in the transverse plane of the central axis Z.

Figure 2:
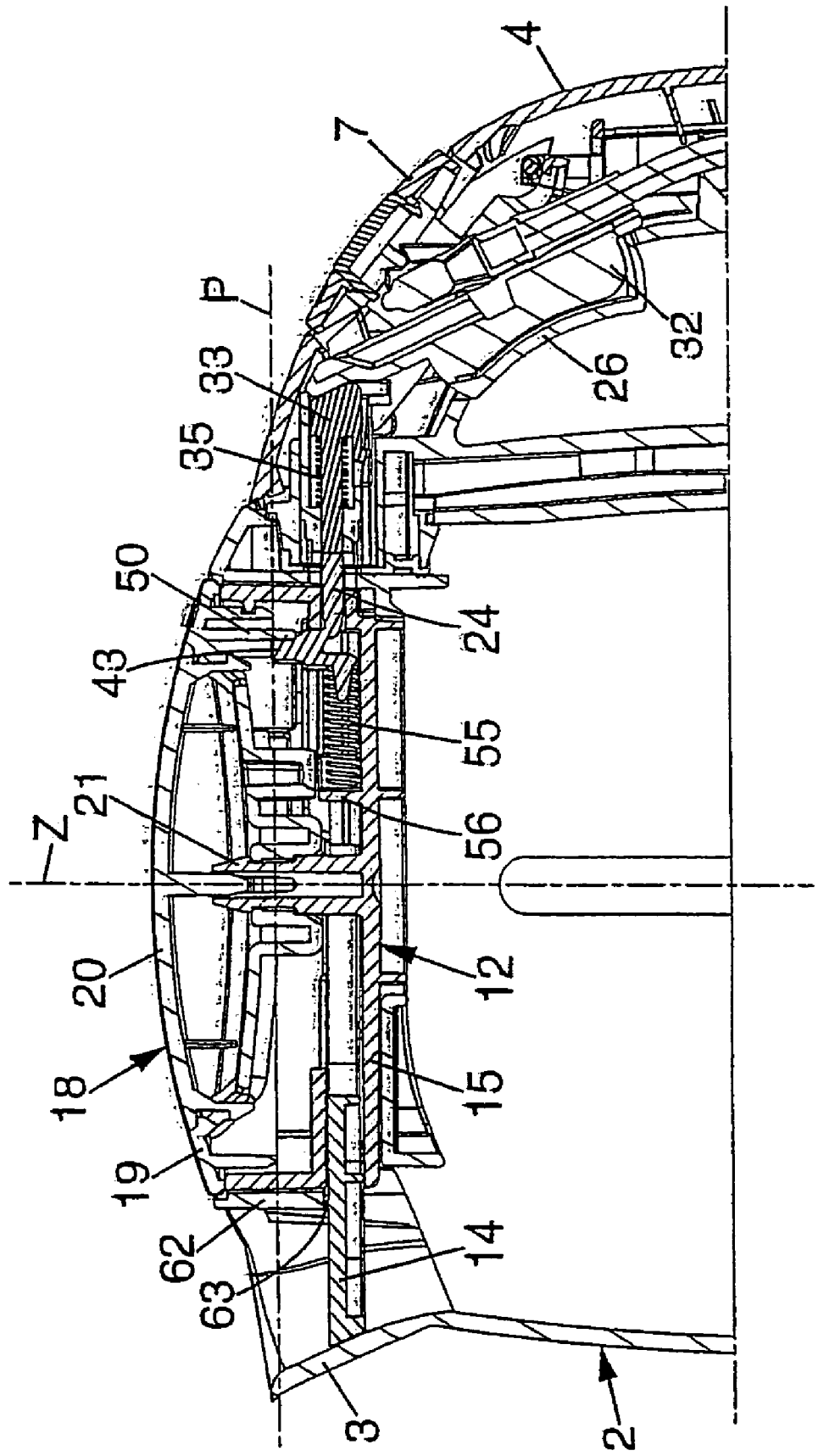
FIG. 2 is a fragmentary longitudinal cross-sectional view in the plane of the handle of the kettle shown in FIG. 1.
Figure 4:
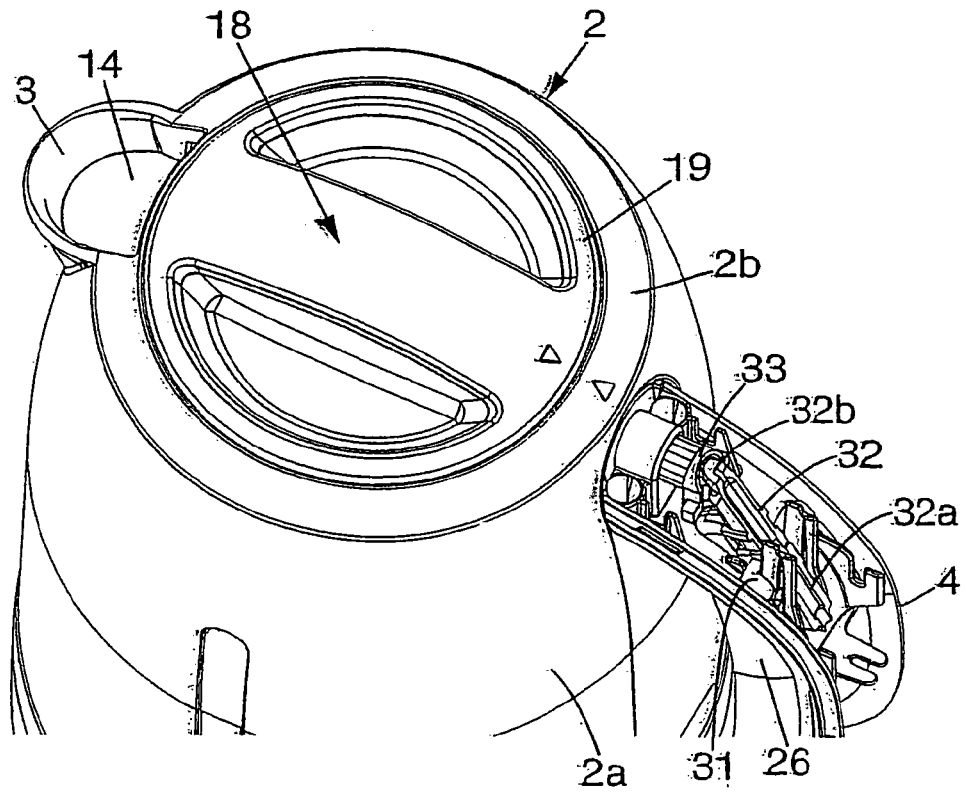
FIG. 4 is a fragmentary perspective view of the kettle with the spout closed.
Figure 6:
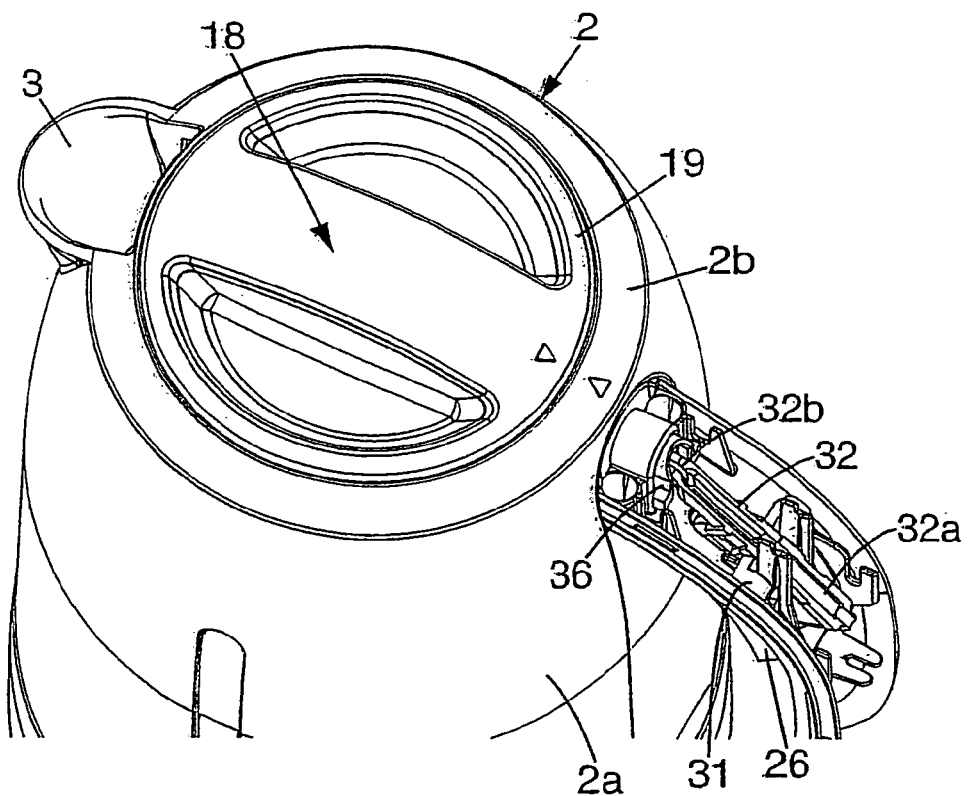
FIG. 6 is a view similar to FIG. 4, in which the spout is opened.
Figure 5:
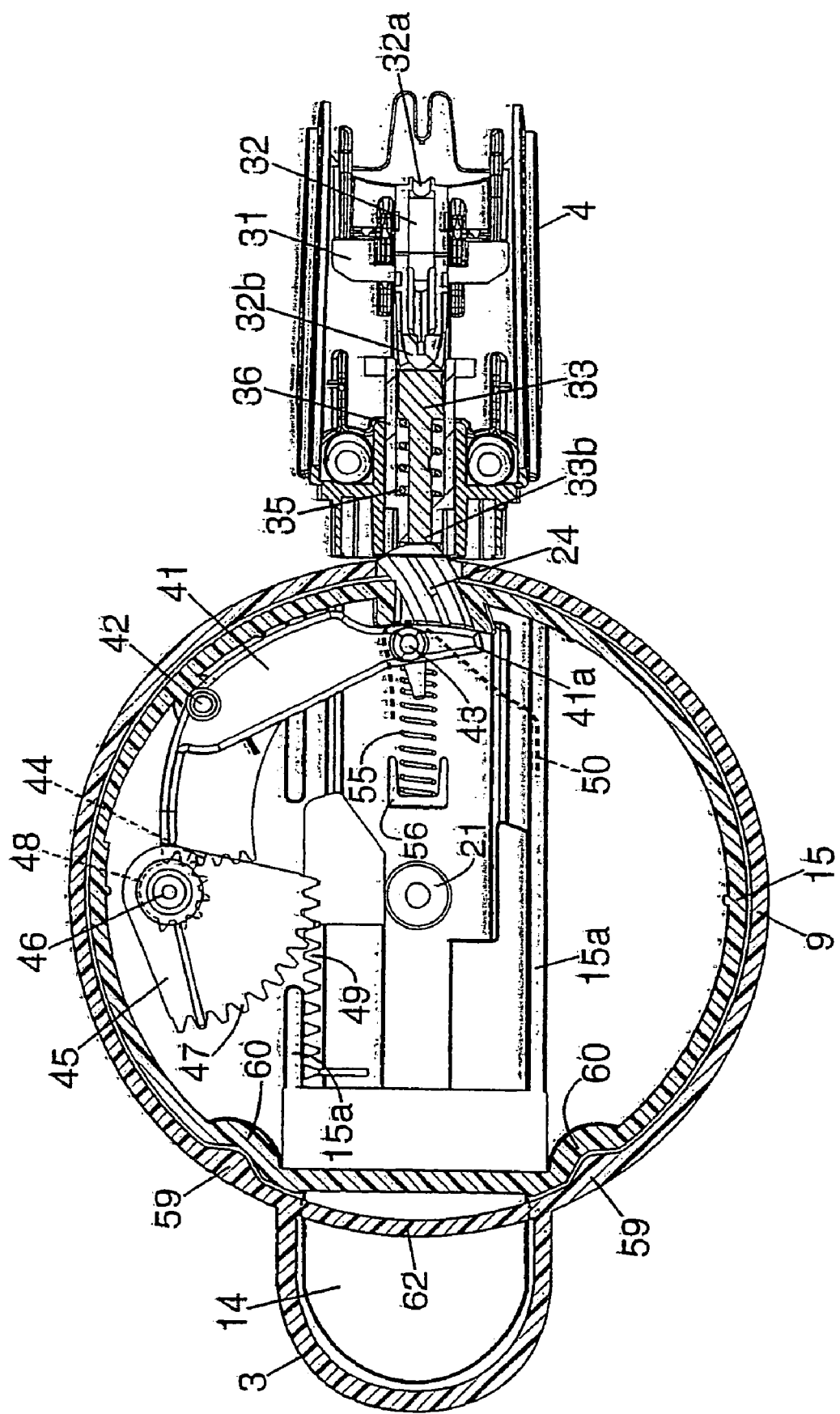
FIG. 5 is a broken away and simplified plan view of FIG. 4.
Figure 7:
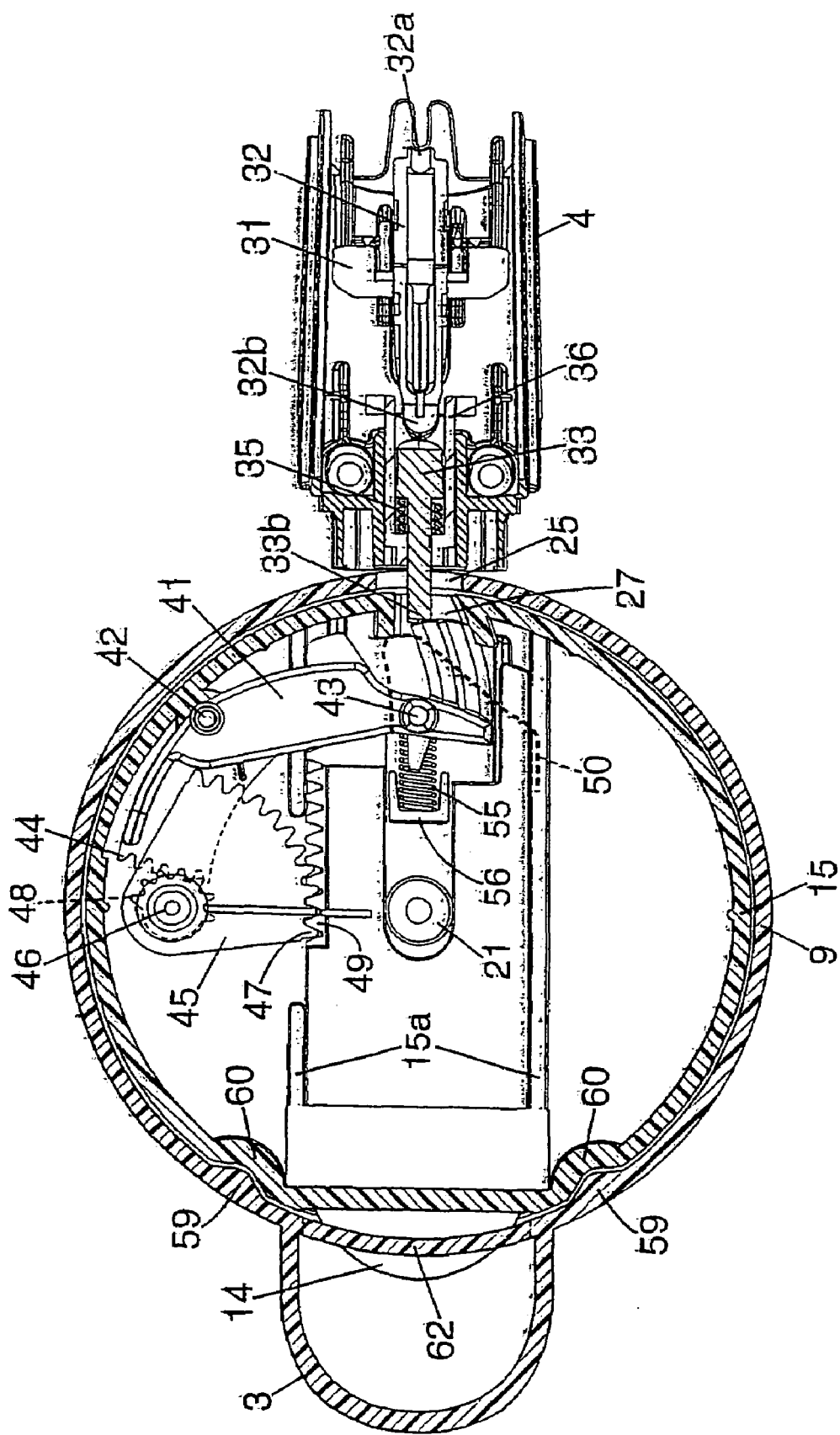
FIG. 7 is a view similar to FIG. 5, in which the spout is opened.

The lid 12 comprises a tongue 14 movably mounted on this latter between an extended position, seen in FIGS. 2, 4 and 5, in which it extends beyond the lid 12 so as to close the spout 3, and a pouring position, seen in FIGS. 6 and 7, in which it is retracted into the lid. The closure provided by the tongue is not completely sealed, but permits avoiding important flow of liquid in the case in which the kettle is tilted.

Of course, the spout 3 should extend at least in part adjacent the opening 10 such that the tongue 14 connected to the lid 12 will not extend over too great a distance between the opening and the spout, and maintain a relatively simple shape. However, the spout 3 could have a more projecting shape relative to the body 2a of the housing.

In the illustrated embodiment, the movement of the tongue 14 is guided within a piece in the form of a cup 15 which forms the bottom of the lid 12. This bottom 15 has on its lower surface two ribs 15a (FIGS. 5 and 7) which guide the tongue 14 in a radial direction relative to the central axis Z through an opening formed in the bottom 15.

The cover 12 is provided moreover with a locking control 18 which comprises a first element 19 forming the upper circular surface of the lid and a gripping member 20 assembled to the upper surface by snapping in.

The locking control 18 is mounted for rotation about an axle 21 secured to the bottom of the lid and extending along the central axis Z. The locking control 18 turns through an angle of about 30°, for example in the clockwise direction, between two positions, respectively called locked and unlocked, which are indicated by marks in the form of arrows on the upper surface 19 of the lid and on the upper edge 2b of the housing, at the level of the handle 4.

The lid 12 moreover comprises a lug 24 movable between a retracted position and an extended position in which it passes through a window 27 of the lid to come to coact with a window 25 passing through the rim 9 of the opening. The lug 24 forms a first lock which comes into engagement with a retaining element of the housing formed by the window 25, thereby preventing the retraction of the lid 12 from the kettle.

The handle 4 of the kettle, in the form of a loop but which could be open, has on its surface facing the body 2a an opening through which is movably mounted a pouring control, such as a trigger 26. The trigger 26, thus placed below the handle, is connected by a first mechanism 30, called a trigger mechanism, to carry out a pouring command. The trigger 26 permits the user to more or less retract the tongue 14 into the lid 12 so as to free the passage of the spout 3 when it is desired to pour the liquid contained in the kettle, as will be detailed hereafter.

The locking control 18 is connected to the tongue 14 and to the lug 24 by a second mechanism 40, called a locking mechanism, which will be detailed hereafter. The locking control 18 is stable in each of its locked/unlocked positions. This stability can be obtained by the friction of the upper surface 19 against the upper edge of the bottom 15, but also thanks to the locking mechanism 40. It will be noted that this stability can be obtained differently, particularly if the locking control is not rotatable, but slidable along a cam track which would then comprise means for blocking the control in the unlocked position.

The first mechanism 30, called the trigger, comprises a lever 32 swingably mounted about an axle 31 supported by the internal structure of the handle 4. The lever 32 has a first end 32a secured to the tongue 26.

The trigger mechanism 30 also comprises a piston 33 slidably mounted in a radial direction, which has a first end against which bears a second end 32b of the swingable lever 32. The piston 33 slides in a tubular member 36 in which is disposed a strong 35 which bears both on this tubular member and on the piston 33, so as to return the trigger 26 to the inactive position by means of the lever 32. But the return of the trigger could be effected otherwise, for example with a helicoidal torsion spring surrounding the axle 31.

In the illustrated embodiment, the tubular member 36 also slides relative to the housing in a radial direction, but the piston 33 could be slidably mounted directly in a recess of the housing.

The piston 33 has a second end 33b which slides through the window 25 of the rim of the opening between a retracted position, shown in FIG. 5, when the trigger 26 is in the inactive position, and a projecting position, shown in FIG. 7, when the trigger 26 is actuated, which is to say pressed by the index finger of the user. The second end 33b is a flat surface which coacts with the end of the lug 24 by simple contact.

The second mechanism 40, called locking mechanism, connects the locking control 18 to the tongue 14. The locking mechanism 40 comprises a lever 41 pivoting about an axle 42 parallel to the central axis Z. Adjacent a first end 41a of the pivoting lever 41 is arranged the lug 24 and a cam 43 in the form of a central vertical pin. The lug 44 extends in the arc of a circle in the median plane of the opening and in an overall radial direction relative to the central axis Z. The pivoting lever 41 has at a second end teeth 44 in the arc of a circle.

The locking mechanism 40 also comprises a member 45 pivoting about an axle 46 which is also parallel to the central axis Z. The pivoting member 45 comprises a first toothed sector 47 of a relatively great radius and a second toothed sector 48 coaxial to the first but of substantially lesser radius. The second toothed sector 48 engages the teeth 44 of the pivoting lever 41, such that the pivoting of the lever 41 gives rise to a pivoting in the opposite direction of the member 45. Because the teeth 44 of the lever 41 have a radius, measured relative to the axle 42, greater than the radius of the second toothed sector 48, the pivoting in the opposite direction of the member 45 is amplified relative to the pivoting of the lever 41.

The first toothed sector 47 of the pivoting member 45 engages a straight rack 49 formed on a tongue which extends in prolongation of the rear end of the tongue 14. In the present embodiment, the straight rack 49 is integrally formed with the tongue 14 and is thus secured to this latter. However, it is envisageable to provide a certain play or a resilient means between the straight rack and the tongue, for example such that the tongue will come to bear more or less in sealed contact against the internal wall of the spout 3.

The engagement of the first toothed sector 47 with the straight rack 49 permits transforming the pivotal movement of the member 45 into a horizontal translatory movement of the tongue 14, which translation is further amplified relative to the amplitude of movement of the first end 41a of the pivoting lever 41 by the difference of the radii existing between the first and second toothed sectors (47, 48). By way of example, there is obtained a movement of 27 mm of the tongue 14 for a radial movement of the end of the lug 24 of about 4 mm.

Figure 3:
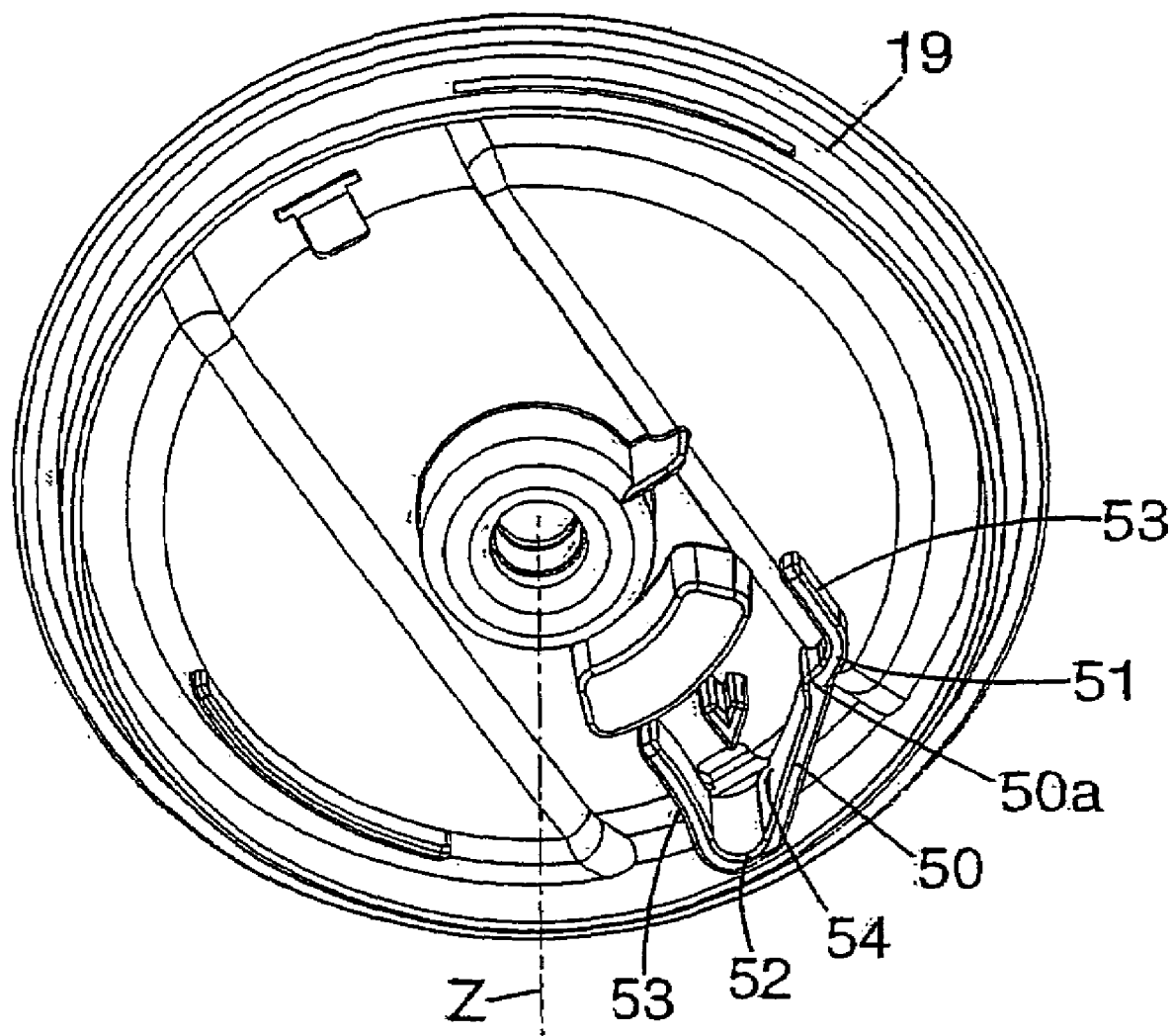
FIG. 3 is a bottom perspective view of an element of the lid.

As is better seen in FIG. 3, the interior side of the upper surface 19, which forms the locking control 18, comprises a cam guide 50 which extends along the central axis Z from the internal side and along a chord of the upper circular surface 19 between a first end 51 and a second end 52. The ends 51 and 52 are prolonged by tongues 53 which extend parallel to the diameter of the circular surface. The first end 51 is located at a distance from the pivotal axle which coincides with the central axis Z, which is less than the distance from the second end 52 to this pivotal axle.

In the locked position of the control 18, the cam 43 bears against the second end 52 of the guide 50, the first end 41a of the lever 41 is near the periphery of the housing, and as a result, the lug 24 and the tongue 14 are in extended position, as is better seen in FIG. 5.

The cam guide 50 (FIG. 3) is present in the form of a wing with a lateral surface 54 oriented toward the central axis Z against which the cam 43 of the pivoting lever 41 comes to bear. The bearing of the cam 43 is obtained thanks to a helicoidal compression spring 55 disposed between an abutment 56 secured to the bottom 15 of the lid 12 and the first end 41a of the pivoting lever 41. Because of the resilience of the bearing of the cam 43 against the cam guide 50, it is possible to space the latter from the cam guide 50 to more or less retract the tongue 14 into the lid, the locking control 18 remaining in locked position.

The lateral surface 54 of the cam guide 50 has a projection 50a (FIG. 3) adjacent the first end 51, which permits effecting a certain blockage of the cam 43, such that the unlocked position is stable.

As is better seen in FIGS. 5 and 7, the rim 9 of the opening comprises two reliefs 59 projecting toward the central axis Z and the lid 12 comprises on the member 15 two complementary hollow reliefs 60. The reliefs (59, 60) coact together when the cylindrical lid 12 is disposed with a correct orientation relative to the rim 9 of the opening, such that the tongue 14 will be positioned facing the spout 3. The reliefs (59, 60) ensure a straightening function and an anti-rotation function of the cover relative to the rim 9 of the opening. Thus, the couple exerted on the control member 18 does not give to rotation of the lid 12. Moreover, the window 27 of the lid 12 comes into correspondence with the window 25 of the rim 9, such that the end 33b of the piston 33 of the trigger mechanism 30 will cooperate with the lug 24 of the locking mechanism 40.

In the illustrated embodiment, the spout 3 is separated from the opening 10 by a partition 62 of the rim 9. As is better seen in FIG. 2, the partition 62 extends in prolongation of the rim 9 from the summit of the vertical portion of the rim, but over a lesser height to provide an opening 63 which opens into the spout 3 and into which the tongue 14 can extend toward the spout 3. When the tongue 14 is in extended position, which is to say when the locking control is in the locked position, the latter comes to be positioned adjacent the lower end of the partition 62, such that the lid 12 is immobilized on the housing 2 of the kettle. The opening 63 and the tongue 14 thus form a second retaining element secured to this housing and hence a second lock movable relative to the lid, in addition to that formed by the window 25 of the rim 9 and the lug 24 of the lever 41.

It is envisageable to provide only the tongue 14 and the opening 63 to ensure the locking of the cover on the housing. However, the presence of two locking points, which moreover are diametrically opposed relative to the central axis Z, ensures a particularly reliable holding of the lid on the housing even if the kettle is tilted.

When the user wishes to pour the liquid by inclining the kettle, he presses with the index finger the trigger 26 which forms the pouring control. This control passes from the inactive position shown in FIGS. 2, 4 and 5, to the active position shown in FIGS. 6 and 7. Under the action of the trigger 26, the lever 32 carries out a swinging which presses the piston 33 toward the central axis Z by compressing the spring 35. The end 33b of the piston 33 thus presses the lug 24 into the lid by compressing the spring 55. The lug 24 secured to the pivoting lever 41 forms a first end of the locking mechanism 40, whose movement gives rise to movement of the second end of the locking mechanism, namely the straight rack 49 connected to the tongue 14.

As a result, the actuation of the trigger 26 permits retracting the tongue 14 via the trigger mechanism 30 which extends from the first end of the swinging lever 32 to the end 33b of the piston 33, and via the locking mechanism 40 which extends from the lug 24 to the straight rack 49. Thus, the spout 3 is open for the free flow of liquid.

The trigger mechanism 30 and the locking mechanism 40 are respectively exposed in the handle 4 and the cover 12, and as a result, are protected from dirt. It also will be seen clearly that the opening 10 of the kettle is entirely free when the lid is removed.

When the user relaxes pressure on the trigger 26, the latter returns to the inactive position under the conjoint action of the spring 55 of the locking mechanism 40 and the spring 35 of the trigger mechanism 30. It is envisageable to use only one spring, particularly the spring 55, to ensure this return. Thus, the cover 12 could have a bias portion to press the piston 33 if this latter were projecting at the time of introduction of the lid. However, the provision of a resilient means for each of the mechanisms (30, 40) permits ensuring their return to the initial position independently of each other, and limits the play in the kinematic chain formed by the two mechanisms.

The configuration shown in FIGS. 6 and 7 corresponds to maximum pressing in of the trigger 26. It will be noted on the one hand, that in this arrangement the piston 33 penetrates into the window 27 of the lid, and on the other hand that a portion of the tongue 14 extends beyond the partition 62. These arrangements are obtained by adjusting the clearance of the trigger 26 and the amplification of this clearance by the trigger mechanism 30, then by the locking mechanism 40. They permit maintaining two locking points of the lid 12 on the housing.

In the illustrated embodiment, the coaction between the two mechanisms (30, 40) is effected by simple pressure against a resilient return force. However it is envisageable to ensure cooperation by providing a reversible securement of the second end of the first mechanism 30 with the first end of the second mechanism 40, for example with light frictional engagement or by magnetic attraction. But the coaction between these ends must be effected automatically, at least when the lid is locked, and must not excessively complicate the opening of the kettle. However, it is possible to pour the liquid while only partially pressing in the trigger 26. The tongue 14 is then slightly retracted, which can permit limiting the flow of the poured liquid.

It will be noted that the assembly of the elements of the locking mechanism 40, namely the pivoting lever 41, the pivoting member 45 and the straight rack 49, is movable in a plane which is parallel to the mean plane of the opening whose trace P is visible in FIG. 2, or else perpendicular to the central axis Z. This arrangement permits providing a lid whose size in the normal direction Z of the opening 10 is particularly reduced.

The pouring control 26 in the form of a trigger placed below the handle is desired by numerous users, but it is possible to arrange it differently, for example in the form of a pushbutton mounted on the body 2a of the housing, without thereby departing from the scope of the present invention.

The invention claimed is:

1. Electrical apparatus for heating liquid comprising a housing (2) which defines a chamber adapted to contain a liquid, an upper opening (10) for filling the chamber, which is delimited by a rim (9), electrical means for heating the liquid, a spout (3) communicating with the chamber and extending adjacent the opening, a lid (12) adapted to close said opening, a tongue (14) movable relative to the lid between an extended position in which it closes the spout (3) and a pouring position in which it is at least partially retracted into the lid, and a pouring control (26) connected to the tongue by an actuating mechanism (30, 40) which is adapted to place said tongue (14) either in extended position when the pouring control (26) is enacted, or in pouring position when the pouring control (26) is active, characterized in that the actuating mechanism (30, 40) connecting the pouring control (26) to the tongue (14) comprises a first mechanism (30) arranged in the housing and having a first end (32a) connected to the pouring control (26) and a second end (33b) movable through a window (25) of the rim (9) of the opening, and a second mechanism (40) arranged in the lid (12) and having a first end (24) movable through a window (27) in said lid (12) and a second end (49) connected to the tongue, the window (25) of the rim (9) and the window (27) of the lid (12) being arranged to come into correspondence when the lid closes the opening, and a second end (33b) of the first mechanism (30) being adapted to coact with the first end (24) of the second mechanism (40) such that the actuation of the pouring control (26) will be transmitted to the tongue (14) via the first (30) and second (40) mechanisms, and wherein the second mechanism (40) is adapted to create an amplified movement of the tongue (14) relative to the movement of the first end (24).

2. Apparatus according to claim 1, in which the second end (33b) of the first mechanism (30) is slidably mounted in a given direction and comes into abutment against the first end (24) of the second mechanism (40), which is movable against the return force of a resilient member (55) in a direction substantially colinear with said given direction.

3. Apparatus according to claim 2, in which the first end (24) of the second mechanism (40) projects through the window (27) of the lid (12) and penetrates the window (25) of the rim (9), when the locking control (26) is inactive.

4. Apparatus according to claim 2, in which the second end (33b) of the first mechanism (30) has a sufficient path to project from the window (25) of the rim (9) and to penetrate the window (27) of the lid (12) when the locking control is active.

5. Apparatus according to claim 1, in which the housing (2) has an opening (63) which opens into the spout (3) and into which extends the tongue (14) of the lid when the latter closes the opening (10), said first (30) and second (40) mechanisms being adapted such that at least a portion of said tongue (14) extends into said opening (63) when the pouring control (26) is activated.

6. Electrical apparatus for heating liquid comprising a housing (2) which defines a chamber adapted to contain a liquid, an upper opening (10) for filling the chamber, which is delimited by a rim (9), electrical means for heating the liquid, a spout (3) communicating with the chamber and extending adjacent the opening, a lid (12) adapted to close said opening, a tongue (14) movable relative to the lid between an extended position in which it closes the spout (3) and a pouring position in which it is at least partially retracted into the lid, and a pouring control (26) connected to the tongue by an actuating mechanism (30, 40) which is adapted to place said tongue (14) either in extended position when the pouring control (26) is enacted, or in pouring position when the pouring control (26) is active, characterized in that the actuating mechanism (30, 40) connecting the pouring control (26) to the tongue (14) comprises a first mechanism (30) arranged in the housing and having a first end (32a) connected to the pouring control (26) and a second end (33b) movable through a window (25) of the rim (9) of the opening, and a second mechanism (40) arranged in the lid (12) and having a first end (24) movable through a window (27) in said lid (12) and a second end (49) connected to the tongue, the window (25) of the rim (9) and the window (27) of the lid (12) being arranged to come into correspondence when the lid closes the opening, and a second end (33b) of the first mechanism (30) being adapted to coact with the first end (24) of the second mechanism (40) such that the actuation of the pouring control (26) will be transmitted to the tongue (14) via the first (30) and second (40) mechanisms, and wherein the second mechanism (40) comprises a lever (41) mounted pivotably about an axle (42) substantially parallel to the normal (Z) of the opening (10), and having a first end (24) forming the first end of said mechanism (40) and a second end provided with teeth (44), said first end (24) being urged radially outwardly by a resilient member (55).

7. Apparatus according to claim 1, in which the first mechanism (30) comprises a lever (32) mounted swingably relative to the housing about an axle (31), and having a first end (32*a*) connected to the pouring control (26) and a second end (32*b*) bearing against a first end of a piston (33), said piston being mounted slidably in said housing against the force of a resilient member (35) and having a second end (33*b*) which forms the second end of said first mechanism (30).

8. Apparatus according to claim 1, in which the housing (2) comprises a handle (4) located on the side opposite the spout (3), and in which the pouring control (26) is present in the form of a trigger arranged below said handle (4).

9. Apparatus according to claim 6, in which the second mechanism (40) comprises a pivotable member (45) provided with a first toothed sector (47) which engages a straight rack (49) connected to the tongue (14) and a second toothed sector (48) which engages the teeth (44) of the second end of the pivoting lever (41), said first toothed sector (47) having a greater radius than the radius of said second toothed sector (48).

10. Electrical apparatus for heating liquid comprising a housing (2) which defines a chamber adapted to contain a liquid, an upper opening (10) for filling the chamber, which is delimited by a rim (9), electrical means for heating the liquid, a spout (3) communicating with the chamber and extending adjacent the opening, a lid (12) adapted to close said opening, a tongue (14) movable relative to the lid between an extended position in which it closes the spout (3) and a pouring position in which it is at least partially retracted into the lid, and a pouring control (26) connected to the tongue by an actuating mechanism (30, 40) which is adapted to place said tongue (14) either in extended position when the pouring control (26) is enacted, or in pouring position when the pouring control (26) is active, characterized in that the actuating mechanism (30, 40) connecting the pouring control (26) to the tongue (14) comprises a first mechanism (30) arranged in the housing and having a first end (32*a*) connected to the pouring control (26) and a second end (33*b*) movable through a window (25) of the rim (9) of the opening, and a second mechanism (40) arranged in the lid (12) and having a first end (24) movable through a window (27) in said lid (12) and a second end (49) connected to the tongue, the window (25) of the rim (9) and the window (27) of the lid (12) being arranged to come into correspondence when the lid closes the opening, and a second end (33*b*) of the first mechanism (30) being adapted to coact with the first end (24) of the second mechanism (40) such that the actuation of the pouring control (26) will be transmitted to the tongue (14) via the first (30) and second (40) mechanisms, and wherein, the second end (33*b*) of the first mechanism (30) has a sufficient path to project from the window (25) of the rim (9) and to penetrate the window (27) of the lid (12) when the locking control is active.

* * * * *